United States Patent
Collins et al.

(10) Patent No.: US 11,132,399 B1
(45) Date of Patent: Sep. 28, 2021

(54) SUMMARY GENERATION BASED ON TRIP

(71) Applicant: Snap Inc., Santa Monica, CA (US)

(72) Inventors: Alexander Collins, Santa Monica, CA (US); Benedict Copping, Los Angeles, CA (US); Justin Huang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/829,997

(22) Filed: Mar. 25, 2020

(51) Int. Cl.
*G06F 16/738* (2019.01)
*G06F 16/787* (2019.01)
*H04L 12/58* (2006.01)
*G06F 16/783* (2019.01)

(52) U.S. Cl.
CPC .......... *G06F 16/739* (2019.01); *G06F 16/787* (2019.01); *G06F 16/7837* (2019.01); *H04L 51/043* (2013.01); *H04L 51/046* (2013.01); *H04L 51/32* (2013.01)

(58) Field of Classification Search
None
See application file for complete search history.

(56) References Cited

U.S. PATENT DOCUMENTS

| | | | | |
|---|---|---|---|---|
| 2004/0064339 A1* | 4/2004 | Shiota | ................ | G06Q 10/10 345/619 |
| 2005/0128305 A1* | 6/2005 | Hamasaki | ............ | G06F 16/51 348/207.99 |
| 2013/0117365 A1* | 5/2013 | Padmanabhan | ......... | H04W 4/21 709/204 |
| 2017/0192965 A1* | 7/2017 | Loscalzo | ................. | G06T 11/60 |
| 2018/0068019 A1* | 3/2018 | Novikoff | ............... | G06F 16/783 |

OTHER PUBLICATIONS

"Surprise!", [Online] Retrieved from the Internet: <URL: https://www.snap.com/en-US/news/post/surprise>, (Oct. 3, 2013), 1 pg.

Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.

(Continued)

*Primary Examiner* — Heather R Jones
(74) *Attorney, Agent, or Firm* — Schwegman Lundberg & Woessner, P.A.

(57) ABSTRACT

Aspects of the present disclosure involve a system comprising a computer-readable storage medium storing a program and a method for generating a summary based on trip information. The program and method include operations for: determining that one or more criteria associated with a user correspond to a trip taken by the user during a given time interval; retrieving a plurality of visual media items generated by a client device of the user during the given time interval; determining location information for the plurality of visual media items; automatically generating a trip graphic to represent the trip based on the plurality of visual media items generated by the user during the given time interval and the determined location information; and causing the trip graphic to be displayed on the client device.

20 Claims, 10 Drawing Sheets

(56) References Cited

OTHER PUBLICATIONS

Etherington, Darrell, "Snapchat Gets Its Own Timeline With Snapchat Stories, 24-Hour Photo and Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.

Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.

* cited by examiner

US 11,132,399 B1

SUMMARY GENERATION BASED ON TRIP

TECHNICAL FIELD

The present disclosure relates generally to generating graphics based on trip media items.

BACKGROUND

Social network sites are some of the most popularly, if not the most popularly, visited sites on the Internet. Social networks provide a vast amount of information about users and their friends. Such information includes current status of users and their interests.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
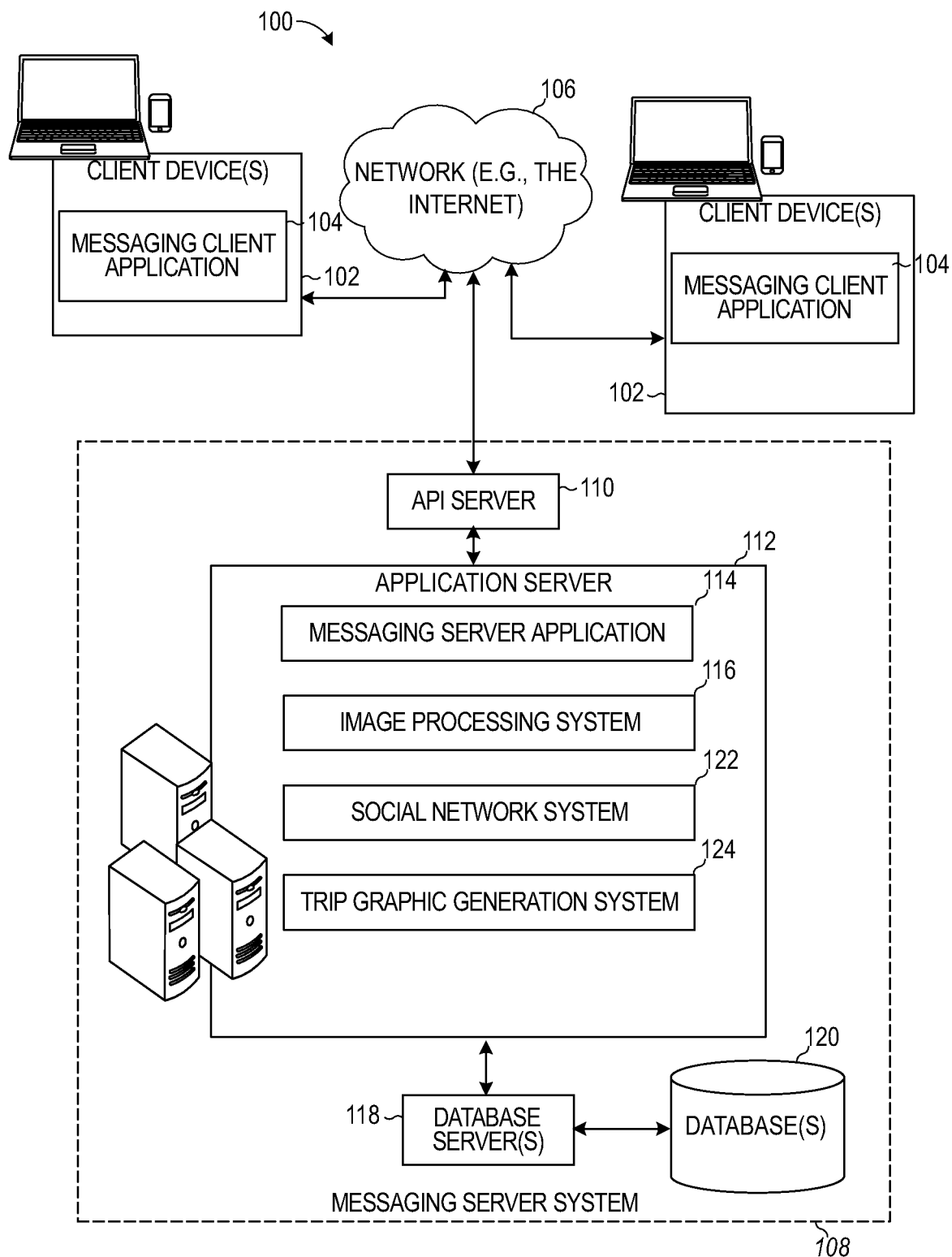
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typically, information about the recent activities various users performed is presented in an unorganized generic manner. In order to discern where a given user currently is or where the user has been, the user's friends have to navigate through a vast amount of content and various pages of information. For example, the friends have to navigate through posts made by the user and photos taken by the user to determine what the user is currently doing or where the user has recently been. While such systems work well for presenting such information, the lack of visual appeal or connection to a specific user and the need to manually navigate through multiple pages of information, makes them less attractive and less intuitive to use, which increases their overall complexity.

The disclosed embodiments improve the efficiency of using the electronic device by generating a trip graphic and incorporating the trip graphic into a messaging application to visually represent a recent trip taken by a user. Specifically, according to some embodiments, one or more criteria associated with a user correspond to a trip taken by the user during a given time interval are determined and a plurality of visual media items generated by a client device of the user during the given time interval is retrieved. Location information for the plurality of visual media items is determined and used to automatically generate a trip graphic to represent the trip based on the plurality of visual media items generated by the user during the given time interval. The trip graphic is then displayed on the client device, such as on a messaging application implemented on the client device.

By presenting to a user's friend or the user themselves the trip graphic for a given trip recently taken by the user, the user and the user's friends are provided with a simple and intuitive interface for obtaining information about the recent trip the user took. Namely, with minimal user input, recent trip information can be visually ascertained by any given user, such as through the trip graphic showing a map with indicators of where the user traveled and thumbnail image representations of images the user captured with the client device while on the trip. This way, users do not need to navigate through a multitude of different pages of information to determine a trip information for a trip recently taken by a given user. This improves the overall efficiencies of the computing device and reduces complexities in using the messaging application.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client application 104 and between a messaging client application 104 and the messaging server system 108 includes functions (e.g., commands to invoke functions) as well as payload data (e.g., text, audio, video, or other multimedia data).

In some embodiments, the messaging client application 104 detects that one or more criteria of a user are indicative of a trip taken by the user. In response, the messaging client application 104 triggers generation of a trip graphic to represent the trip. The trip graphic may include an avatar, a static or animated image of a map, one or more pins or circles on the map corresponding to locations visited while on the trip, or one or more thumbnail images of visual media items captured by the client device 102 while on the trip. The trip graphic may be non-interactive or interactively selectable to access trip visual media items.

To detect that one or more criteria of a user are indicative of a trip taken by the user, the messaging client application 104 first determines a home location of the user. This home location may be specified by the user or may be automatically determined based on measuring how long a user spends at the same location for a specified period of time. For example, the messaging client application 104 determines that the user spends more than 80% of the user's time at the same home location (e.g., within a 25 mile radius of a specific GPS coordinate or address). In response, the messaging client application 104 sets the specific GPS coordinate or address to be the home location.

The messaging client application 104 next determines that the client device 102 has left the home location. In response, the messaging client application 104 measures how long the user spends away from the home location. The messaging client application 104 stores one or more new destination locations corresponding to the location away from the home location. In some cases, the messaging client application 104 begins storing the one or more destination locations when a distance between the home location and the destination locations exceeds a specified distance threshold (e.g., 60 miles). The messaging client application 104 determines when the client device 102 has returned to the home location after spending time at the destination locations. In response to determining that the client device 102 has spent more than a specified threshold (e.g., 24 hours) at the home location after returning from the destination locations, the messaging client application 104 determines that one or more criteria of a user are indicative of a trip taken by the user. In such cases, the messaging client application 104 triggers generation of a trip graphic to represent the destination locations and the trip taken by the user. While certain functions are discussed as being performed by the messaging client application 104, any one of these functions can be alternatively performed by a remote server (e.g., messaging server system 108) or a combination of the messaging client application 104 and the remote server.

In some embodiments, the messaging client application 104 identifies a set of content or visual media items generated by the user or the client device 102 while at the one or more destination locations. The messaging client application 104 processes the visual media items to generate a collection of tags that are descriptive of the content and to determine locations (e.g., latitude and longitude or GPS coordinates) of each media item in the visual media items. The messaging client application 104 compares the location of each of the visual media items to each other to identify a distance between each of the visual media items. The messaging client application 104 groups the visual media items based on the identified distances such that a first group of the visual media items includes a first subset of the visual media items associated with locations that are within a first threshold distance of each other and a second group of the visual media items includes a second subset of the visual media items associated with locations that are within a second threshold distance of each other. As an example, the first group of visual media items represents visual media items captured while visiting a first city or landmark in a particular region and the second group of visual media items represents visual media items captured while visiting a second city or landmark in another region.

The messaging client application 104 ranks the collection of tags within each of the first and second groups to identify a tag for each group that has a highest priority. The tags may be ranked based on a type of activity represented by the tag (e.g., a rare activity that is performed), a quality of the media item associated with the tag, whether the media item was shared with other users and the number of other users with which the media item was shared, and so forth. The messaging client application 104 selects a representative media item from each of the first and second groups of visual media items that is associated with the highest priority tag within the respective collection. The messaging client application 104 reduces a size of each representative visual media items to generate a thumbnail image for the representative media item from the first group and a thumbnail image for the representative media item from the second group.

In some embodiments, the messaging client application 104 triggers generation of the trip graphic on the basis of one or more conditions being satisfied. For example, the messaging client application 104 triggers generation of the trip graphic if the messaging client application 104 determines that the user generated three or more media items (assets) or content while on the trip (e.g., while the user was at the one or more destinations) and that the three or more media items have geographical tags that are more than 30 miles away from the home location. The messaging client application 104 may also trigger the generation of the trip graphic in response to determining that the user has returned to the home location more than 24 hours ago. In some cases, the messaging client application 104 may find multiple trips taken by the user and in such cases, the messaging client application 104 selects the trip for generating the trip graphic that was taken less than 6 months ago.

The messaging client application 104 accesses a map system to retrieve a map image corresponding to the trip taken by the user. The messaging client application 104 may request a map that corresponds to the city, GPS coordinates, latitude and longitude coordinates of the trip. As an example, the messaging client application 104 selects a first group of visual media items having the largest number of media items associated with a location that is within a specified threshold of each other. The messaging client application 104 requests a map at a first zoom level corresponding to the location of the first group. The map at the first zoom level is requested to fit in a portrait size (length and width) of images and videos presented by other features of the messaging client application 104. Specifically, the messaging client application 104 determines the size of an image or video that is presented in the messaging client application 104 and in which the trip graphic will be presented. The messaging client application 104 requests the map at the first zoom level that shows regions of the map within a window of the same size as the image or video that is presented by the messaging client application 104. The messaging client application 104 determines whether the location of a second group of visual media items captured on the trip is included in the map at the first zoom level. If not, the messaging client application 104 requests another map at a second zoom level that is zoomed out relative to the first zoom level and shows a great amount of area but less detail than the map at the first zoom level. The messaging client application 104 determines whether now both the locations of the visual media items in the first and second groups are included in the map at the second zoom level. If so, the messaging client application 104 uses the map at the second zoom level to generate the trip graphic.

The messaging client application 104 identifies a first centroid location of the first group of visual media items. To do so, the messaging client application 104 averages all of the locations of the first collection of visual media items and sets the centroid to be the average of all the locations of the first collection. In some cases, the first centroid represents locations in the first collection that are closest to each other than other locations. The messaging client application 104 next identifies a second centroid location of the second group of visual media items. To do so, the messaging client application 104 averages all of the locations of the second group of visual media items and sets the second centroid to be the average of all the locations of the second collection. The messaging client application 104 adds an indicator (e.g., a pin element or circle) on the map at the second zoom level at locations on the map corresponding to the first and second centroid locations. The messaging client application 104 presents next to each indicator the thumbnail generated for each of the first and second groups. For example, the messaging client application 104 retrieves the first thumbnail generated for the first group and adds the thumbnail next to the first indicator corresponding to the first centroid. The messaging client application 104 retrieves the second thumbnail generated for the second group and adds the thumbnail next to the second indicator corresponding to the second centroid. In some implementations, the thumbnail cycles through all of the images in the respective group such that each media item is shown in the thumbnail for a specified period of time (e.g., 3 seconds). In some implementations, the thumbnail for the first group remains static and the thumbnail for the second group cycles through the visual media items in the second group.

The messaging client application 104 transcodes the map with the indicators and thumbnails from a first format to a second format to generate an image of the trip graphic. The messaging client application 104 presents the trip graphic in a dedicated portion of the messaging client application 104 for presenting trips. In some implementations, the messaging client application 104 presents the trip graphic as a thumbnail image associated with the visual media items captured on the trip. The trip graphic can be selected to access and retrieve for display all of the visual media items captured on the trip. In some implementations, the trip graphic can be shared with one or more friends of the user who took the trip. In some implementations, the trip graphic is presented on a profile page of the user and can be viewed by other users of the messaging client application 104.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the messaging server application 114, and for possible access by another messaging client application 104; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the trip graphic generation system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the trip graphic generation system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The application server 112 is communicatively coupled to a database server 118, which facilitates access to a database 120 in which is stored data associated with messages processed by the messaging server application 114.

Figure 2:
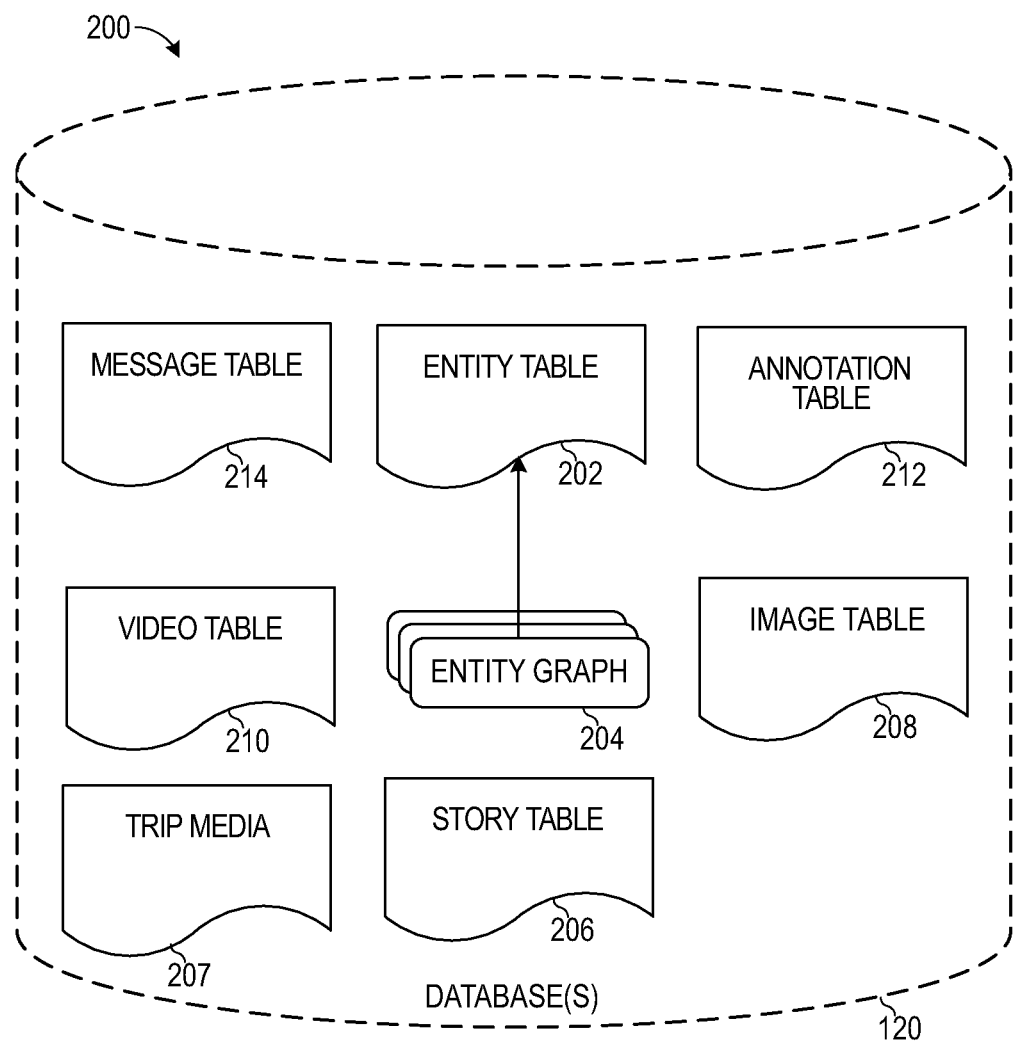
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Trip media 207 stores visual media items captured by a client device 102 while on a trip. Trip media 207 groups visual media items based on time and location. Specifically, trip media 207 determines a time interval for a trip taken by a user and identifies all the visual media items captured by the client device during the time interval. The trip media 207 associates tags with each visual media item by processing content of each media item or receiving inputs defining tags for each media item. The trip media 207 associates a location with each media item that specifies the GPS coordinates or latitude and longitude coordinates of the media item when the media was captured.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
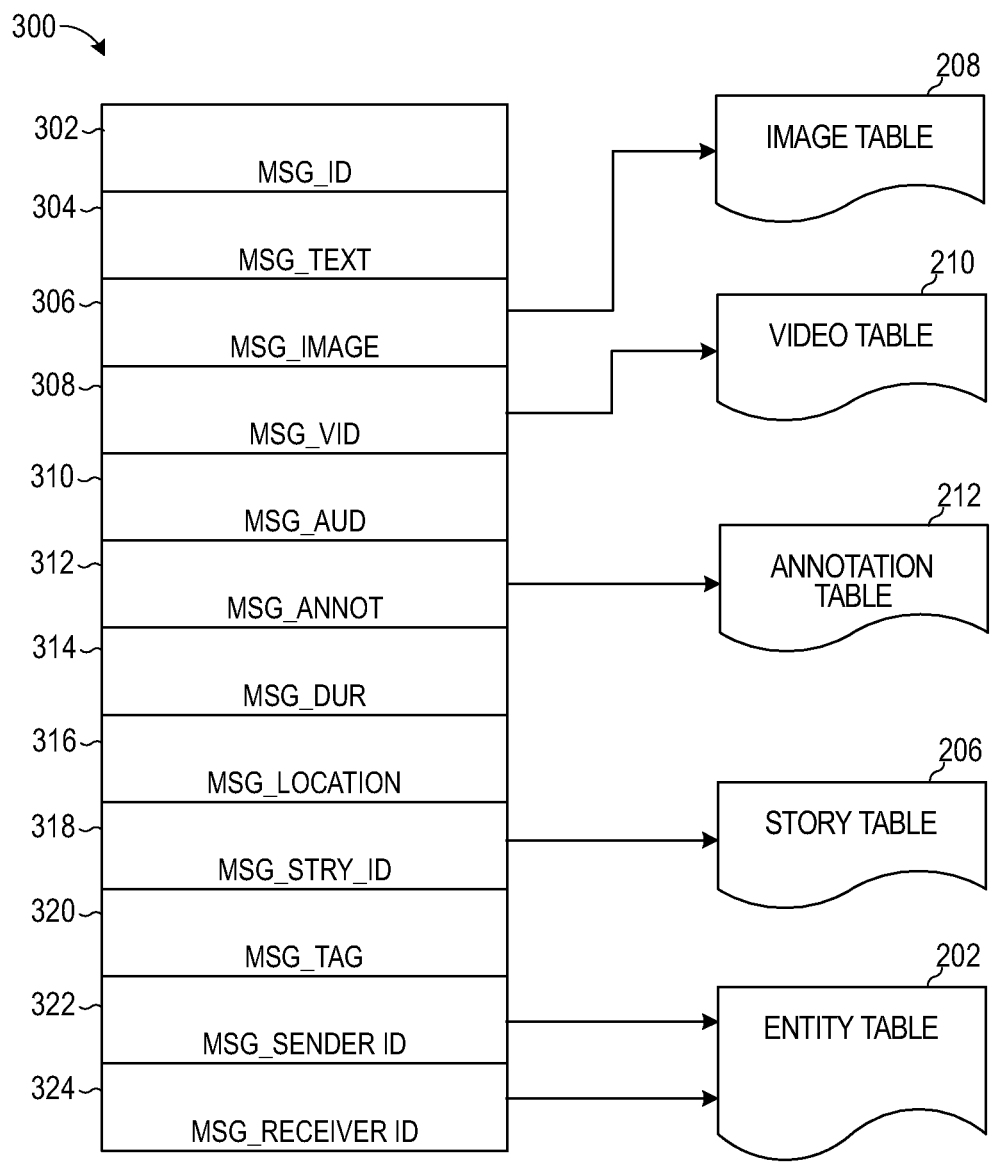
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
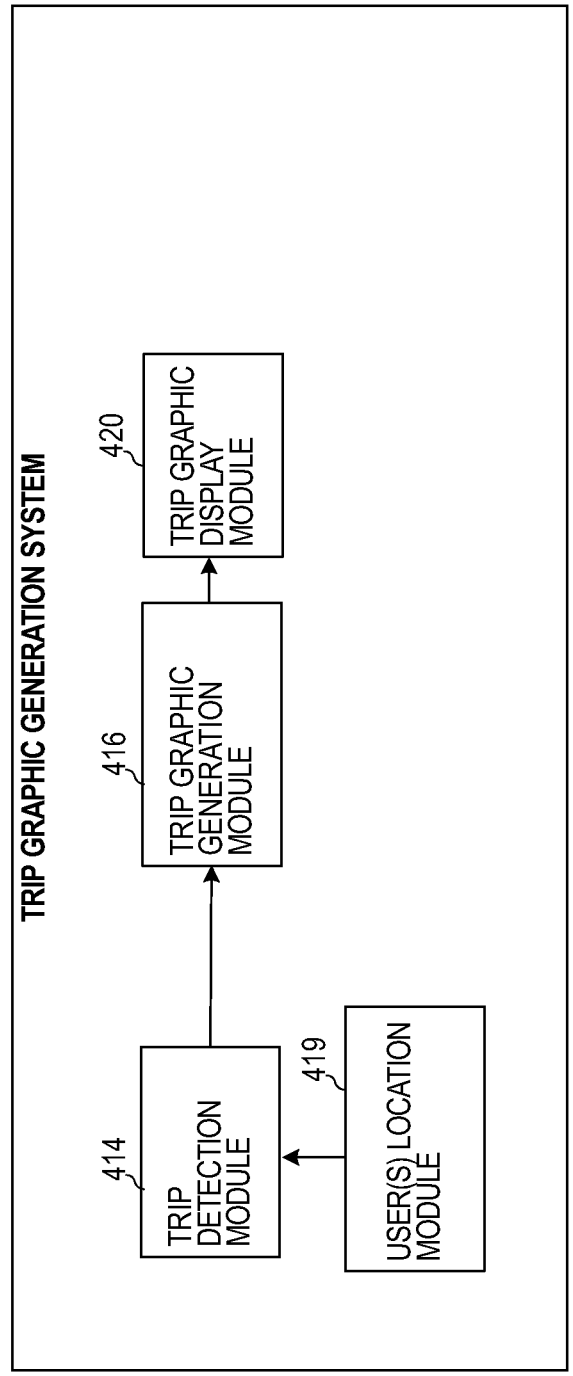
FIG. 4 is a block diagram showing an example trip graphic generation system, according to example embodiments.

FIG. 4 is a block diagram showing an example trip graphic generation system 124, according to example embodiments. Trip graphic generation system 124 includes a trip detection module 414, a user(s) location module 419, a trip graphic generation module 416, and a trip graphic display module 420.

User(s) location module 419 accesses a GPS system of the client device 102 for a given user to determine the geographical location of the client device 102. The user location module 419 identifies a home location of the client device 102 by identifying a geographical location that the client device 102 is in for a majority of the time (e.g., more than 80% of the time). In some cases, the user location module 419 receives user input that specifies the home location by providing the address or GPS location of the home address. The user location module 419 generates a radius (e.g., 25 miles) around the home location. The user location module 419 determines when the client device 102 leaves the radius of the home location and in response marks the new locations as a potential travel destination. The user location module 419 measures how long the client device 102 spends away from the home location at one or more potential travel destinations. The user location module 419 stores the destination locations of each potential travel destination along with the time stamps when the potential travel destinations were visited by the client device 102.

Trip detection module 414 processes the data from the user location module 419 to determine when a given trip a user has taken began and ended. For example, the trip detection module 414 determines a starting time of when the client device 102 left the home location and an ending time of when the client device 102 returned to the home location. If the difference between the starting time and the ending time exceeds a threshold (e.g., more than 2 days), the trip detection module 414 determines that the client device 102 was on a trip between the starting time and the ending time. The trip detection module 414 determines whether the client device has stayed at the home location for more than a threshold period of time (e.g., more than 24 hours) after returning to the home location. In response, the trip detection module 414 may trigger generation of a trip graphic to represent the trip taken by the user between the starting time and the ending time.

The trip detection module 414 determines one or more parameters of the trip. For example, the trip detection module 414 determines weather at the destinations visited away from the home location. The trip detection module 414 determines if the weather at the destinations differs from the weather at the home location. If so, the trip detection module 414 instructs trip graphic generation module 416 to modify properties (e.g., a background) of the trip graphic (e.g., a color scheme, clouds, rain, snow, or other weather related attributes that are presented on a map). As an example, the map represented as the trip graphic can include rain drops if the weather at the destinations is determined to have been rainy during a majority of the trip.

The trip detection module 414 retrieves media 207 (e.g., posts to a social network, messages exchanged between users, videos, and images) generated by the client device 102 while the client device 102 was away from the home location and on the trip. For example, the trip detection module 414 retrieves a collection of media 207 generated by the client device 102 between the start time and end time of the trip. The trip detection module 414 processes the media 207 to generate a plurality of tags (e.g., metadata that is descriptive of each media item). The trip detection module 414 ranks the plurality of tags based on one or more criteria (e.g., frequency of occurrence, rarity factor, user preferences, importance, and so forth) and provides the tags of each media item to the trip graphic generation module 416.

The trip graphic generation module 416 compares the location of each of the media 207 captured while on the trip to each other to identify a distance between each of the visual media items. The trip graphic generation module 416 groups the visual media items based on the identified distances such that a first group of the visual media items includes a first subset of the visual media items associated with locations that are within a first threshold distance of each other and a second group of the visual media items includes a second subset of the visual media items associated with locations that are within a second threshold distance of each other. As an example, the first group of visual media items represents visual media items captured while visiting a first city or landmark in a particular region and the second group of visual media items represents visual media items captured while visiting a second city or landmark in another region.

The trip graphic generation module 416 ranks the collection of tags within each of the first and second groups to identify a tag for each group that has a highest priority. The tags may be ranked based on a type of activity represented by the tag (e.g., a rare activity that is performed), a quality of the media item associated with the tag, whether the media item was shared with other users and the number of other users with which the media item was shared, and so forth. The trip graphic generation module 416 selects a representative media item from each of the first and second groups of visual media items that is associated with the highest priority tag within the respective collection. The trip graphic generation module 416 reduces a size of each representative visual media items to generate a thumbnail image for the representative media item from the first group and a thumbnail image for the representative media item from the second group.

The trip graphic generation module 416 accesses a map system to retrieve a map image corresponding to the trip taken by the user. The trip graphic generation module 416 may request a map that corresponds to the city, GPS coordinates, latitude and longitude coordinates of the trip. As an example, the trip graphic generation module 416 selects a first group of visual media items having the largest number of media items associated with a location that is within a specified threshold of each other. The trip graphic generation module 416 requests a map at a first zoom level corresponding to the location of the first group. The map at the first zoom level is requested to fit in a portrait size (length and width) of images and videos presented by other features of the messaging client application 104. Specifically, the trip graphic generation module 416 determines the size of an image or video that is presented in the messaging client application 104 and in which the trip graphic will be presented. The trip graphic generation module 416 requests the map at the first zoom level that shows regions of the map within a window of the same size as the image or video that is presented by the messaging client application 104. The trip graphic generation module 416 determines whether the location of a second group of visual media items captured on the trip is included in the map at the first zoom level. If not, the trip graphic generation module 416 requests another map at a second zoom level that is zoomed out relative to the first zoom level and shows a great amount of area but less detail than the map at the first zoom level. The trip graphic generation module 416 determines whether now both the locations of the visual media items in the first and second groups are included in the map at the second zoom level. If so, the trip graphic generation module 416 uses the map at the second zoom level to generate the trip graphic. The map may be retrieved from a third-party application or server.

The trip graphic generation module 416 adds an indicator (e.g., a pin element or circle) on the map at the second zoom level at locations on the map corresponding to the first and second centroid locations. The trip graphic generation module 416 presents next to each indicator the thumbnail generated for each of the first and second groups. For example, the trip graphic generation module 416 retrieves the first thumbnail generated for the first group and adds the thumbnail next to the first indicator corresponding to the first centroid. The trip graphic generation module 416 retrieves the second thumbnail generated for the second group and adds the thumbnail next to the second indicator corresponding to the second centroid. The trip graphic generation module 416 combines the map with the indicators and the thumbnail (optionally) to generate the trip graphic. In some cases, the trip graphic generation module 416 also adds avatars representing users that were on the trip. For example, the trip graphic generation module 416 may determine that a friend of the user was within a threshold distance (e.g., 3 miles) of the user during the time interval of the trip. In response, the trip graphic generation module 416 retrieves an avatar for the friend and an avatar for the user and adds the avatars to the trip graphic (e.g., in the center of the map or at a location on the map where the two users spent the greatest amount of time together).

Trip graphic display module 420 retrieves the trip graphic for the user associated with the client device 102. The trip graphic display module 420 presents the trip graphic in a dedicated portion of the messaging client application 104 for presenting trips. In some implementations, the trip graphic display module 420 presents the trip graphic as a thumbnail image associated with the visual media items captured on the trip.

Figure 5:
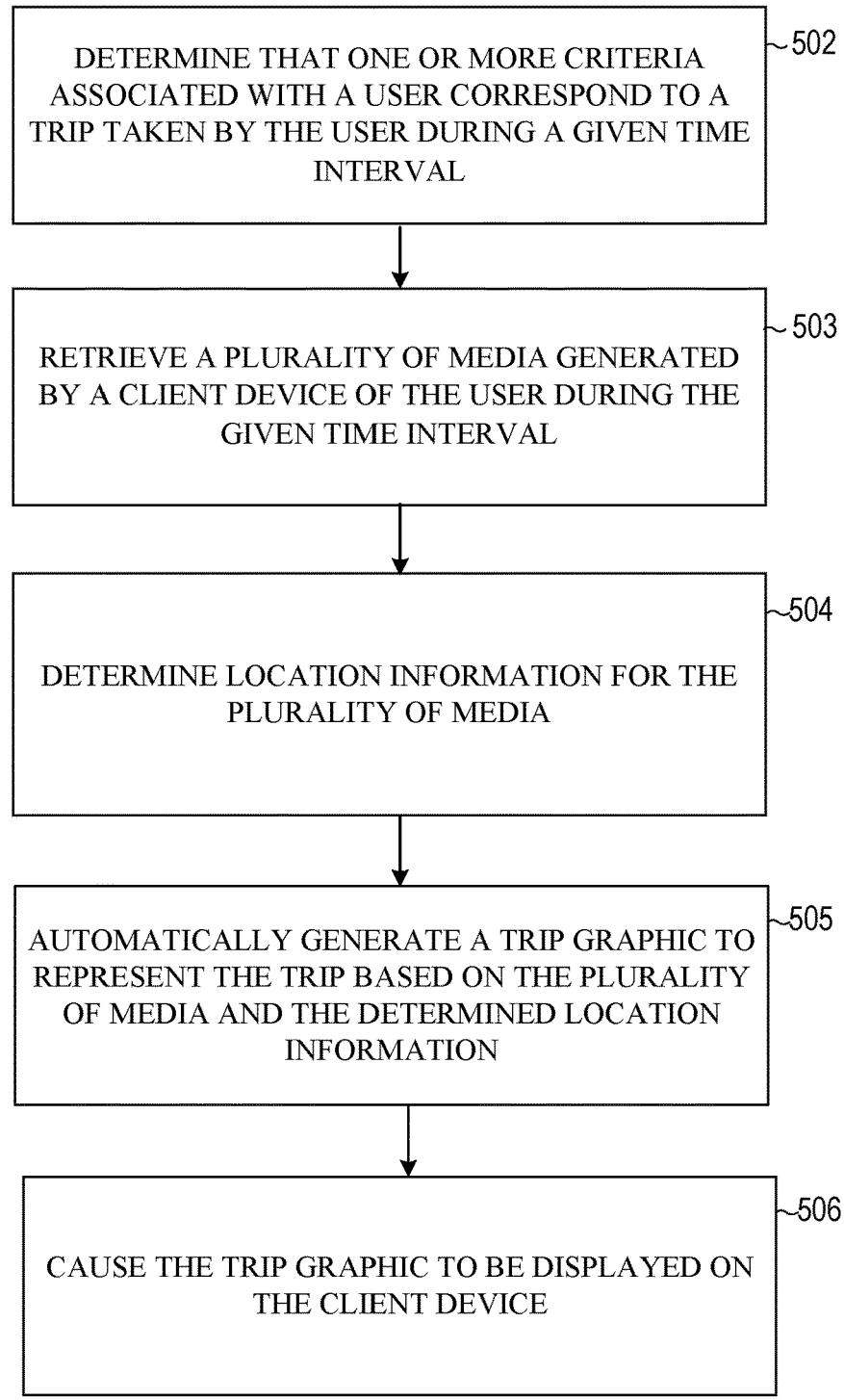
FIG. 5 is a flowchart illustrating example operations of the trip graphic generation system, according to example embodiments.

FIG. 5 is a flowchart illustrating example operations of the trip graphic generation system 124 in performing process 500, according to example embodiments. The process 500 may be embodied in computer-readable instructions for execution by one or more processors such that the operations of the process 500 may be performed in part or in whole by the functional components of the messaging server system 108; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 502, the trip graphic generation system 124 determines that one or more criteria associated with a user correspond to a trip taken by the user during a given time interval. For example, the trip detection module 414 determines a starting time of when the client device 102 left the home location and an ending time of when the client device 102 returned to the home location. If the difference between the starting time and the ending time exceeds a threshold (e.g., more than 2 days), the trip detection module 414 determines that the client device 102 was on a trip between the starting time and the ending time.

At operation 503, the trip graphic generation system 124 retrieves a plurality of visual media items generated by a client device of the user during the given time interval. For example, the trip detection module 414 retrieves a collection of media 207 generated by the client device 102 between the start time and end time of the trip.

At operation 504, the trip graphic generation system 124 determines location information for the plurality of visual media items. For example, the trip graphic generation module 416 obtains the GPS or latitude and longitude coordinates of each media item generated by the client device during the given time interval.

At operation 505, the trip graphic generation system 124 automatically generates a trip graphic to represent the trip based on the plurality of visual media items and the determined location information. For example, the trip graphic generation module 416 obtains a map having dimensions corresponding to a size of an image or video displayed by a messaging client application 104. The trip graphic generation module 416 adds indicators (e.g., circles or pins) at locations corresponding to the visual media items and, optionally, adds thumbnail images of visual media items captured at the different locations. The trip graphic generation module 416 combines the map, indicators, and thumbnails into a trip graphic for presentation to a user.

At operation 506, the trip graphic generation system 124 causes the trip graphic to be displayed on the client device. For example, the trip graphic display module 420 presents the trip graphic in a dedicated portion of the messaging client application 104 for presenting trips or a collection of visual media items related to a trip. In some cases, the dedicated portion includes a tab that a user can select to access and view different trips. Each trip may be represented by a different trip graphic. When a given trip graphic is selected, the visual media items corresponding to the trip is retrieved and presented to the user.

In some embodiments, the trip graphic generation system 124 automatically identifies a trip taken by a user during a given time interval. The trip graphic generation system 124 automatically collects visual media content or items generated during the trip into a collection. The trip graphic generation system 124 automatically generates a selectable or non-selectable UI element (e.g., a trip graphic) based on the collected visual media content or items to represent the trip. The UI element may be selectable to view the collected visual media content or items.

Figure 6:
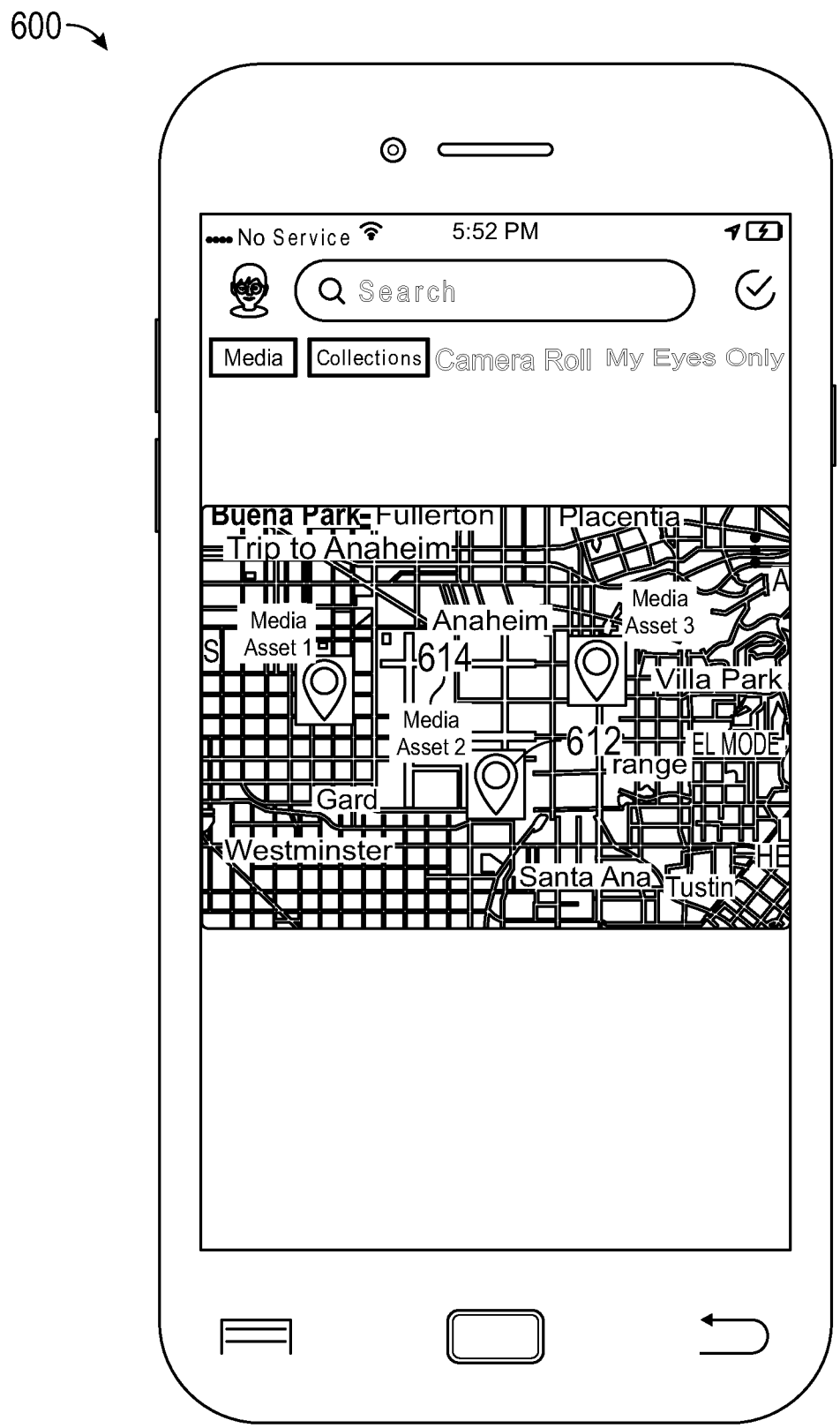
FIGS. 6-8 are illustrative inputs and outputs of the trip graphic generation system, according to example embodiments.
Figure 7:
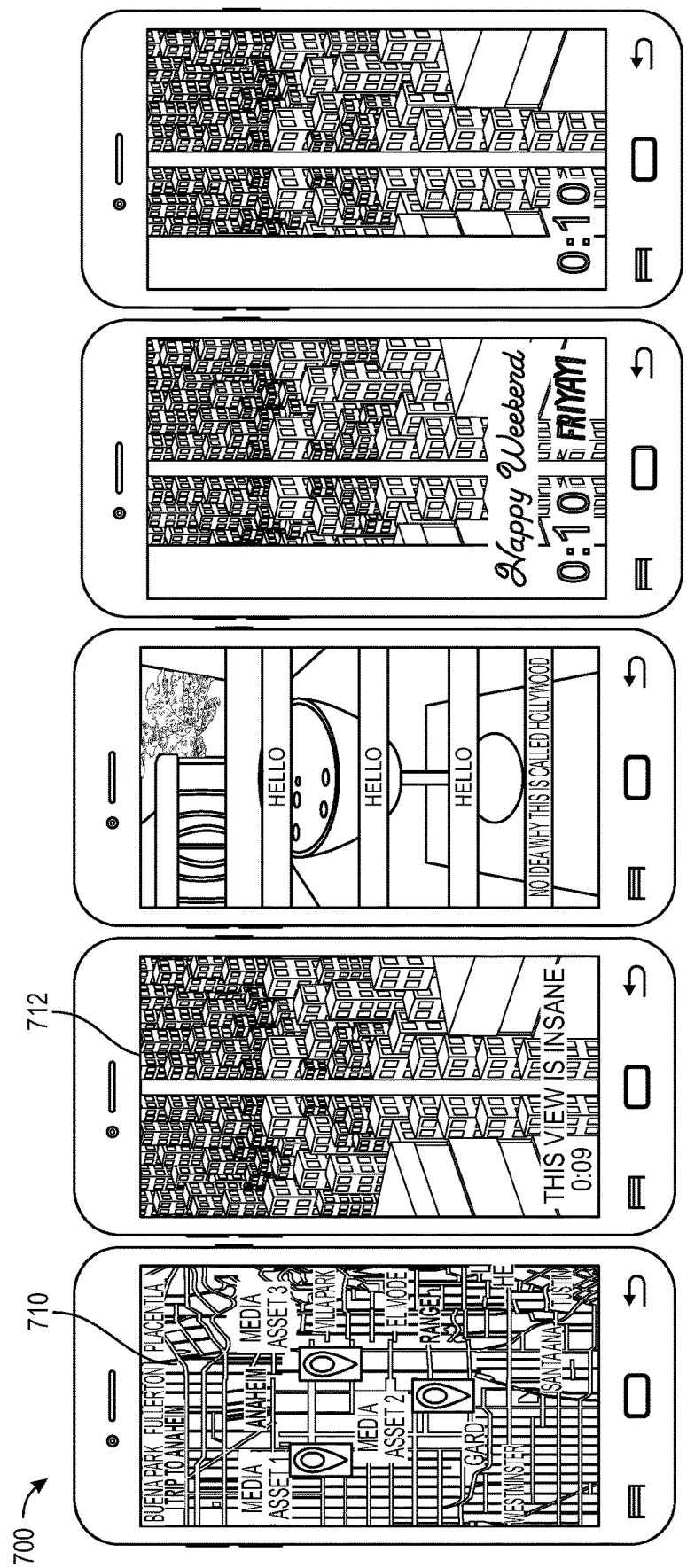
Figure 8:
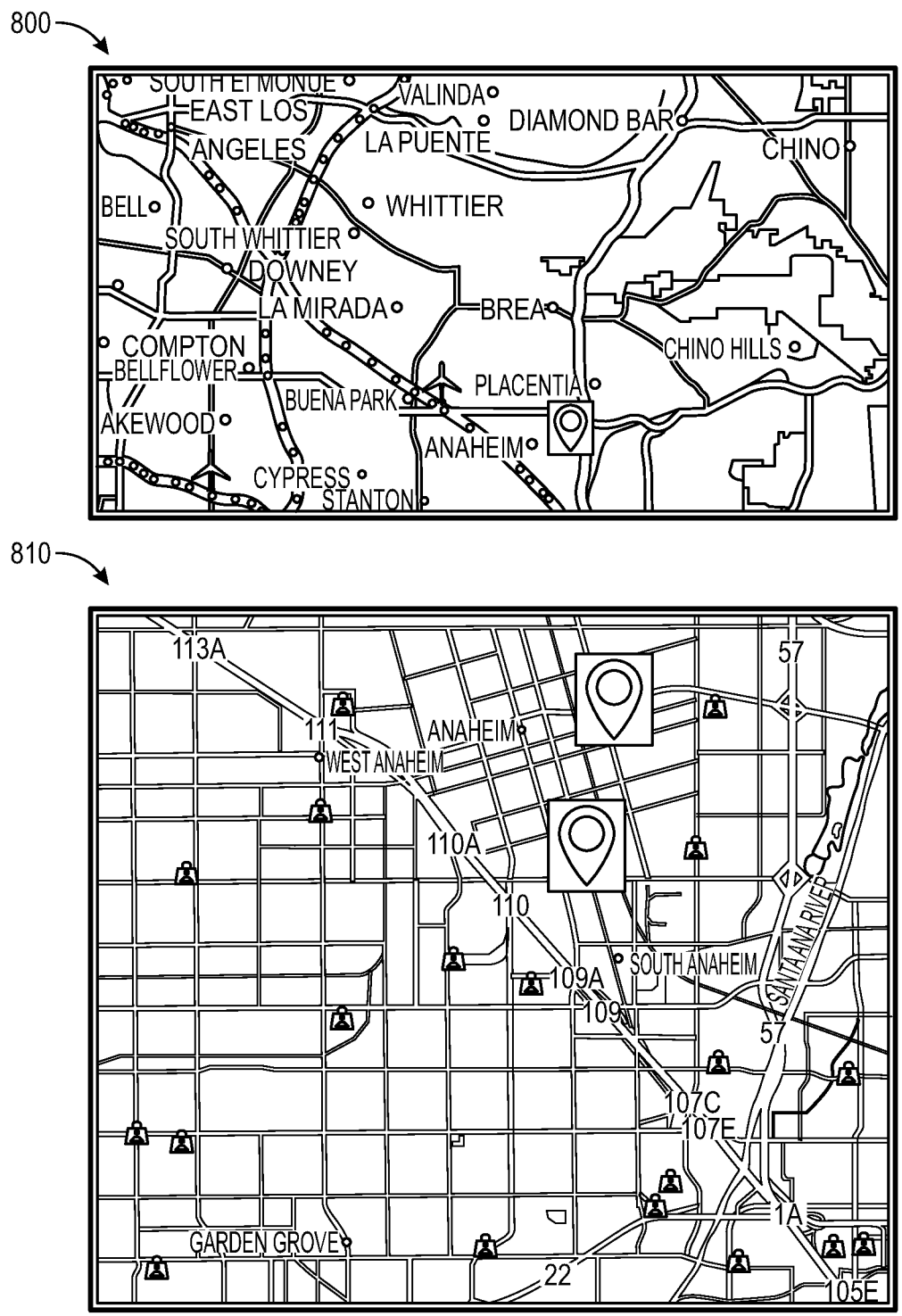

FIGS. 6-8 show illustrative inputs and outputs of the trip graphic generation system 124, according to example embodiments. As shown in FIG. 6, trip graphic generation system 124 presents a user interface 600 that includes various tabs for accessing different collections of visual media items. A media tab can be selected to view all visual media items generated by a client device 102. A collections tab can be selected to view different collections of visual media items. Each collection can correspond to different trips or manually collected images and videos. The visual media items in each collection is automatically and sequentially presented in response to receiving a user selection of the collection. A trip graphic 610 is presented in the user interface 600. This trip graphic may be presented in the collections tab to represent a given trip. Each trip in the collection can be represented by a respective trip graphic 610.

The trip graphic 610 includes a map on which indicators 612 are presented. The indicators 612 correspond to different locations of various groups of the visual media items generated by the client device 102 while on the trip. For example, the indicator 612 corresponds to visual media items that each is associated with a location that is within a specified threshold distance of each other or within a specified threshold distance of a given city or landmark on the map (e.g., Santa Ana). The map zoom level can be selected from various different zoom levels, shown in FIG. 8. As an example, a first zoom level 800 may be too close relative to a second zoom level 810. In the first zoom level 800, only a subset of the locations visited while on the trip are represented and shown in the map. In response to determining that a portion of the locations are not shown on the map, the trip graphic generation system 124 requests the map in a second zoom level 810. The second zoom level may be farther away and, as such, may present map locations that include all of the locations visited by the client device 102 while on the trip. The trip graphic generation system 124 selects the map with the second zoom level 810 for use in generating the trip graphic.

Referring back to FIG. 6, the trip graphic generation system 124 associates different thumbnails 614 with each indicator 612 shown on the map. Each thumbnail includes an image or video selected from a group of visual media items associated with the respective location of the indicator 612. As an example, the thumbnail 614 includes a reduced size version of an image or video selected from the group of visual media items associated with or having a location within a specified threshold of the indicator 612. The image or video can be selected based on a priority of a tag associated with each image or video in the group of visual media items. The image or video may correspond to a media item in the group having a tag with a highest priority within the group.

In response to receiving a user selection of the trip graphic, the trip graphic generation system 124 presents the media items associated with the trip, as shown in FIG. 7. Specifically, the trip graphic generation system 124 retrieves all of the media 700 captured or generated by the client device 102 while on the trip, organizes the visual media items according to some criteria (e.g., chronologically or by location), and presents the visual media items in a sequence. One or a subset of media 712 is presented for a first amount of time and then another one or another subset of visual media items is presented for the first amount of time or a second amount of time. Initially, the trip graphic 710 may be presented before any of the visual media items associated with the trip.

Figure 9:
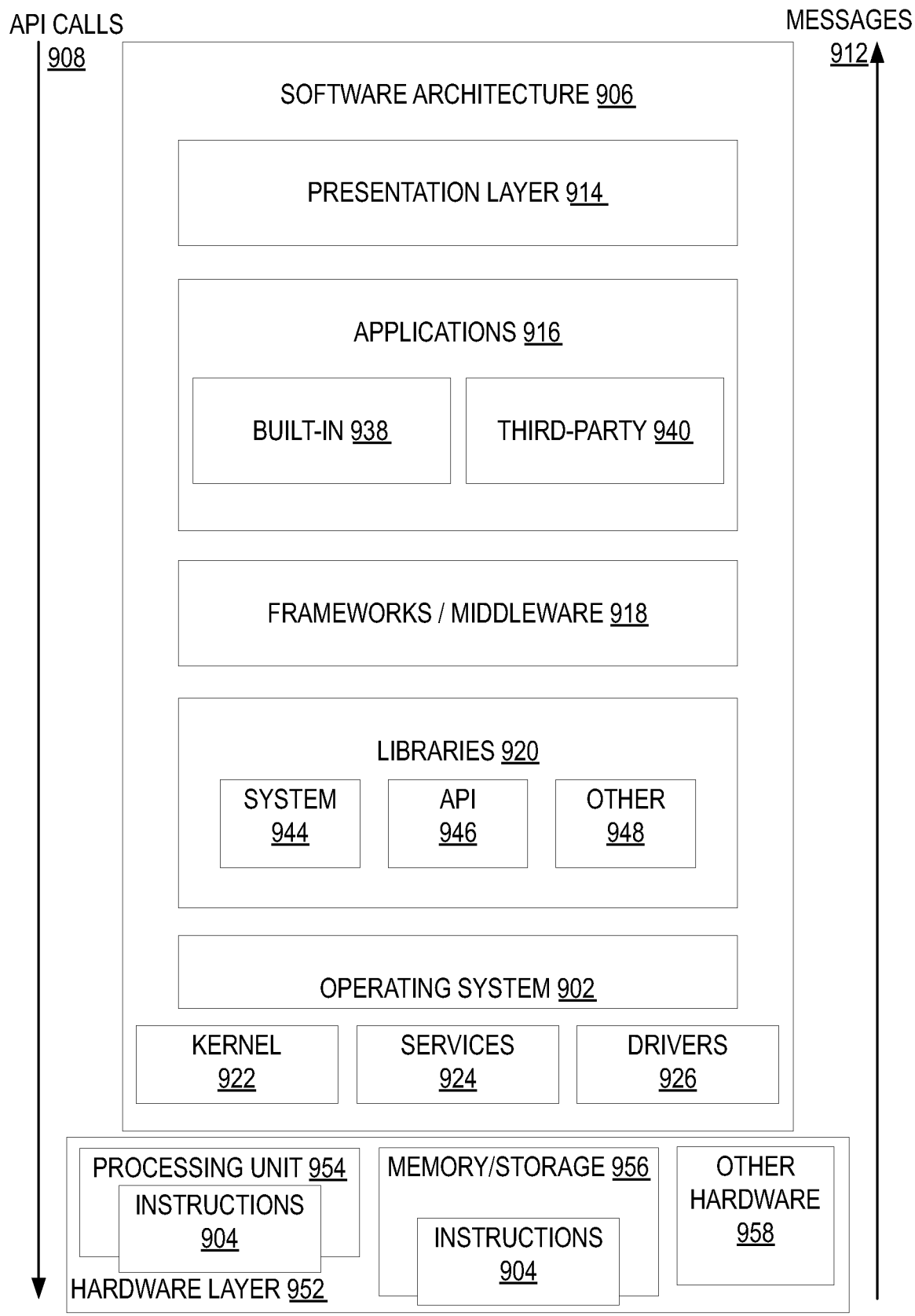
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic UI (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
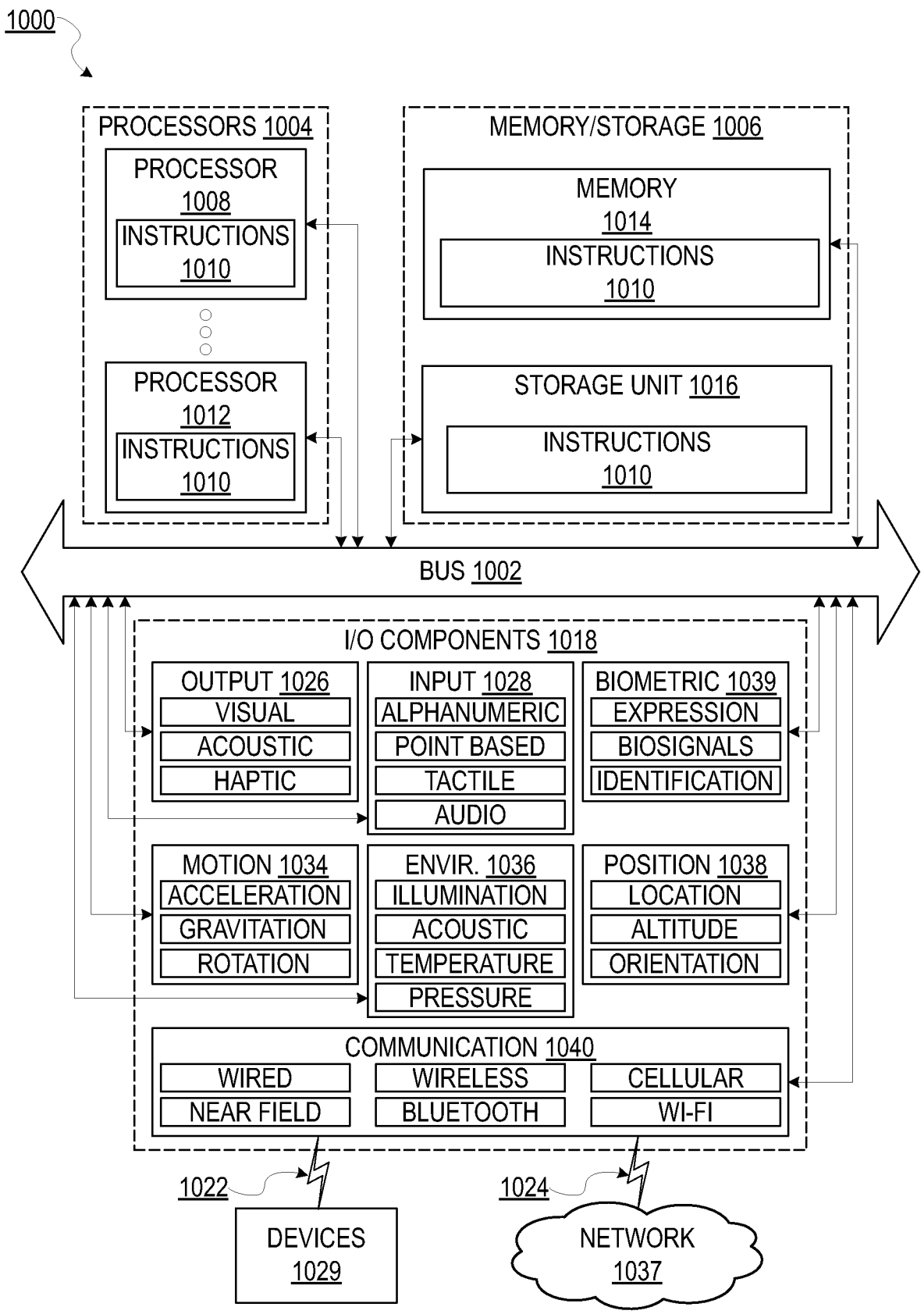
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1039, motion components 1034, environmental components 1036, or position components 1038 among a wide array of other components. For example, the biometric components 1039 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1037 or devices 1029 via coupling 1024 and coupling 1022, respectively. For example, the communication components 1040 may include a network interface component or other suitable device to interface with the network 1037. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1029 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID)

tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code,", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
    determining, by one or more processors, that one or more criteria associated with a user correspond to a trip taken by the user during a given time interval;
    retrieving, by the one or more processors, a plurality of visual media items generated by a client device of the user during the given time interval;
    determining location information for the plurality of visual media items;
    obtaining a map having a dimension that matches a dimension of a given visual media item of the plurality of visual media items;
    automatically generating a trip graphic by adding a representation of one or more of the plurality of visual media items to the obtained map that has the dimension that matches the dimension of the given visual media item, the trip graphic representing the trip based on the plurality of visual media items generated by the user during the given time interval and the determined location information; and
    causing the trip graphic to be displayed on the client device.

2. The method of claim 1, wherein the determining that the one or more criteria associated with the user correspond to the trip comprises:
    determining a home location for the user; and
    determining that a travel location indicated by the location information is spaced from the home location by more than a specified threshold distance.

3. The method of claim 1, further comprising:
    determining that the client device has been at a different location than a home location for more than a specified threshold;

detecting when the client device returns to the home location after being at the different location; and triggering the automatic generation of the trip graphic after a specified period of time has elapsed since the client device returned to the home location.

4. The method of claim 1, further comprising:

determining that the client device has been at a different location than a home location for more than a specified threshold; and generating the given time interval based on a first time at which the client device has left the home location and a second time at which the client device returned to the home location.

5. The method of claim 1, wherein the trip graphic comprises a static image, further comprising incorporating the static image of the trip graphic into a trip collection comprising a subset of the plurality of visual media items.

6. The method of claim 5, wherein the static image is presented as a first image in the trip collection, and wherein each media item in the subset of the plurality of visual media items is presented according to a display sequence.

7. The method of claim 1, wherein the trip graphic is reduced in size to generate an interactive thumbnail, wherein selection of the interactive thumbnail causes a trip collection comprising a subset of the plurality of visual media items to be retrieved and presented.

8. The method of claim 1, further comprising:

overlaying on the map a first thumbnail of a first visual media item in a first group of the plurality of visual media items.

9. The method of claim 8, further comprising:

overlaying on the map a second thumbnail of a second visual media item in a second group of the plurality of visual media items, the first thumbnail and the second thumbnail being displayed concurrently.

10. The method of claim 9, further comprising:

automatically cycling display in the first thumbnail of each visual media item in the first group such that each visual media item in the first group is displayed in the first thumbnail for a specified period of time.

11. The method of claim 10, wherein a visual media item of the second group displayed in the second thumbnail remains static as the first thumbnail cycles display of each visual media item in the first group.

12. The method of claim 11, wherein the first and second thumbnails are displayed on the map next to visual indicators that comprise map pins or circles that represent coordinates associated with each of the plurality of visual media items.

13. The method of claim 12, further comprising:

generating a first visual indicator of the visual indicators by identifying the first group of the plurality of visual media items for which latitude and longitude coordinates are within a first threshold distance of each other; and generating a second visual indicator of the visual indicators by identifying the second group of the plurality of visual media items for which latitude and longitude coordinates are within a second threshold distance of each other.

14. The method of claim 13, further comprising:

selecting a first media item from the first group of the plurality of visual media items;

selecting a second media item from the second group of the plurality of visual media items;

generating first and second thumbnail images corresponding to the first and second media items, respectively;

presenting the first thumbnail image adjacent to the first visual indicator on the map; and presenting the second thumbnail image adjacent to the second visual indicator on the map.

15. The method of claim 8, further comprising:

generating a plurality of tags that are descriptive of the visual media items in the first group of the plurality of visual media items;

ranking the plurality of tags based on one or more criteria; and selecting, for display in the first thumbnail, the first visual media item from the visual media items in the first group of the plurality of visual media items based on determining that a tag of the plurality of tags associated with the first visual media item outranks one or more tags of the plurality of tags associated with a remaining set of the visual media items in the first group of the plurality of visual media items.

16. The method of claim 1, wherein generating the trip graphic comprises:

obtaining a latitude and longitude coordinate for each of the plurality of media based on the location information;

computing a central point based on the latitude and longitude coordinate for each of the plurality of visual media items; and retrieving a map image corresponding to the central point.

17. The method of claim 1, further comprising:

determining weather at the location of the trip taken by the user;

determining that the weather at the location of the trip taken by the user differs from weather at a home location of the user; and in response to determining that the weather at the location of the trip taken by the user differs from the weather at the home location of the user, modifying visual properties of the trip graphic to represent the weather at the location of the trip taken by the user.

18. The method of claim 1, further comprising:

transcoding the trip graphic from a first format to a second format; and adding to the trip graphic one or more avatars representing one or more users that were on the trip taken by the user, wherein a location for displaying the one or more avatars in the trip graphic is selected in response to determining that the one or more users spent a greatest amount of time at the selected location relative to other locations associated with the trip.

19. A system comprising:

a processor configured to perform operations comprising:

determining that one or more criteria associated with a user correspond to a trip taken by the user during a given time interval;

retrieving a plurality of visual media items generated by a client device of the user during the given time interval;

determining location information for the plurality of visual media items;

obtaining a map having a dimension that matches a dimension of a given visual media item of the plurality of visual media items;

automatically generating a trip graphic by adding a representation of one or more of the plurality of visual media items to the obtained map that has the dimension that matches the dimension of the given visual media item, the trip graphic representing the trip based on the plurality of visual media items generated by the user during the given time interval and the determined location information; and causing the trip graphic to be displayed on the client device.

20. A non-transitory machine-readable storage medium that includes instructions that, when executed by one or more processors of a machine, cause the machine to perform operations comprising:

determining that one or more criteria associated with a user correspond to a trip taken by the user during a given time interval;

retrieving a plurality of visual media items generated by a client device of the user during the given time interval;

determining location information for the plurality of visual media items;

obtaining a map having a dimension that matches a dimension of a given visual media item of the plurality of visual media items;

automatically generating a trip graphic by adding a representation of one or more of the plurality of visual media items to the obtained map that has the dimension that matches the dimension of the given visual media item, the trip graphic representing the trip based on the plurality of visual media items generated by the user during the given time interval and the determined location information; and causing the trip graphic to be displayed on the client device.

* * * * *

UNITED STATES PATENT AND TRADEMARK OFFICE
CERTIFICATE OF CORRECTION

PATENT NO. : 11,132,399 B1
APPLICATION NO. : 16/829997
DATED : September 28, 2021
INVENTOR(S) : Collins et al.

Page 1 of 1

It is certified that error appears in the above-identified patent and that said Letters Patent is hereby corrected as shown below:

On the Title Page

Item (22), in "Filed", in Column 1, Line 1, after "Mar. 25, 2020", insert:
--¶(65) Prior Publication Data
US 2021/0303621 A1 Sep. 30, 2021--

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*